United States Patent [19]

Volkmann et al.

[11] Patent Number: 5,620,648
[45] Date of Patent: Apr. 15, 1997

[54] PROCESS FOR THE PREPARATION OF PREFABRICATED VEHICLE WINDOWS

[75] Inventors: Curtis L. Volkmann, Saginaw; Henry W. Griffin, Bloomfield Hills, both of Mich.

[73] Assignee: Essex Specialty Products, Inc., Auburn Hills, Mich.

[21] Appl. No.: 565,489

[22] Filed: Nov. 30, 1995

[51] Int. Cl.$^6$ ............ B29C 33/00; B29C 39/10; B29C 47/00
[52] U.S. Cl. ............ 264/511; 156/108; 264/252; 264/254; 264/255; 264/271.1; 264/279
[58] Field of Search ............ 156/108; 264/252, 264/254, 255, 260, 275, 271.1, 279, 511; 269/84.1, 93; 52/204.62, 204.67, 204.591, 204.597, 716.5

[56] References Cited

U.S. PATENT DOCUMENTS

| | | | |
|---|---|---|---|
| 3,654,005 | 4/1972 | Higgins et al. | 156/108 |
| 3,968,612 | 7/1976 | Endo et al. | 52/400 |
| 4,551,372 | 11/1985 | Kunert | 428/38 |
| 4,571,278 | 2/1986 | Kunert | 156/108 |
| 4,581,276 | 4/1986 | Kunert et al. | 156/108 |
| 4,704,175 | 11/1987 | Kunert et al. | 156/108 |
| 4,755,339 | 7/1988 | Reilly et al. | 264/252 |
| 4,761,916 | 8/1988 | Sanok et al. | 49/381 |
| 4,780,520 | 10/1988 | Rizk et al. | 528/53 |
| 4,830,804 | 5/1989 | Weaver | 264/252 |
| 4,839,122 | 6/1989 | Weaver | 264/129 |
| 4,879,853 | 11/1989 | Braendle et al. | 52/208 |
| 4,986,867 | 1/1991 | Braendle et al. | 156/244.11 |
| 5,068,076 | 11/1991 | Weaver et al. | 264/511 |
| 5,069,852 | 12/1991 | Leone et al. | 264/171 |
| 5,095,669 | 3/1992 | Kunert et al. | 52/208 |
| 5,158,638 | 10/1992 | Osanami et al. | 156/245 |
| 5,197,243 | 3/1993 | Mozawa et al. | 52/208 |
| 5,236,650 | 8/1993 | Choby et al. | 264/135 |
| 5,330,597 | 7/1994 | Leuchten et al. | 156/108 |

FOREIGN PATENT DOCUMENTS 4-334435  11/1992  Japan.

*Primary Examiner*—Michael W. Ball
*Assistant Examiner*—Richard Crispino

[57] ABSTRACT

A prefabricated vehicle window having an exterior molding is prepared by (a) placing a protective film inside a glass support fixture having a cavity to line the cavity; (b) depositing a bead of a first hardenable polymeric material (first bead) on top of the protective film in an amount sufficient to fully cover the marginal edges of the outer surface of a glass sheet subsequently placed on the glass support fixture; (c) placing a glass sheet having exposed side surfaces, inner surface and outer surface on the glass support fixture, with the outer surface facing toward the glass support fixture, and at least a portion of its periphery pressing against the first bead which causes the first bead to conform to the shape and contour of the film-covered glass support fixture cavity and cover the adjacent exposed marginal edges of the outer glass surface, and squeezes out any excess first bead over to the exposed side surfaces, thereby partially or fully covering the exposed side surfaces; and (d) depositing a bead of a second hardenable polymeric material (second bead) in the glass support fixture in an amount sufficient to cover the marginal edges of the glass inner surface, and the glass side surfaces.

10 Claims, 3 Drawing Sheets

PROCESS FOR THE PREPARATION OF PREFABRICATED VEHICLE WINDOWS

BACKGROUND OF THE INVENTION

This invention relates to vehicle windows and, more particularly, to prefabricated vehicle windows having exterior moldings. The moldings cover the junction between the marginal edges of the glass sheet and the adjacent portions of the vehicle body and provide the vehicle with a pleasant appearance.

Processes for manufacturing prefabricated windows having exterior moldings are well known in the art. One such process is disclosed in Japanese Patent application laid-open publication No. 58-113,480, wherein the peripheral edge of a window glass is placed in the cavity of an injection mold, and the exterior molding is formed by injecting a hardenable polymeric material into the mold cavity. In this process, the window glass tends to be subjected to damage due to the high injection pressure of the polymeric material.

Other known processes for manufacturing prefabricated windows having exterior moldings, such as, for example, the process disclosed in U.S. Pat. No. 4,571,278 to Saint-Gobain Vitrage, Courbevoie, France, involve the use of machines to deposit a hardenable polymeric material along the periphery of the window glass. These machines do not allow the vehicle manufacturer the flexibility to make any changes to the sizes, colors, shapes, and other styling features of the moldings without installing additional machines to make the desired changes. In addition, these machines use fine-slotted extrusion nozzles which are not adapted to compensate for the uneven thickness of the window glass. Typically, the nozzle is placed at a fixed position from the glass, and as close to the glass as possible, as the polymeric material tends to lose its compactness of form shortly after emerging from the nozzle. The nozzle is typically programmed to straddle the inner and outer glass surfaces to deposit the hardenable polymeric material on the periphery of the window glass. If the nozzle is made of metal, glass breakage can occur when the nozzle comes in contact with the glass with sufficient force. Such glass breakage can be avoided by using a plastic nozzle. However, using a plastic nozzle has a disadvantage, in that a plastic nozzle would wear out and become distorted easily and would produce a distorted bead of hardenable polymeric material.

It would be desirable to provide a simple process for preparing a vehicle window having an exterior molding which is flexible to accommodate any molding shape and/or style desired by the vehicle manufacturer.

SUMMARY OF THE INVENTION

In a first aspect, this invention is a process for preparing a prefabricated vehicle window having an exterior molding comprising the sequential steps of:

(a) placing a protective film inside a glass support fixture having a cavity to line the cavity;

(b) depositing a bead of a first hardenable polymeric material (first bead) on top of the protective film, in an amount sufficient to fully cover the marginal edges of the outer surface of a glass sheet subsequently placed on the glass support fixture;

(c) placing a glass sheet having exposed side surfaces, inner surface and outer surface on the glass support fixture, with the outer surface facing toward the glass support fixture, and at least a portion of its periphery pressing against the first bead which causes the first bead to conform to the shape and contour of the film-covered glass support fixture cavity and cover the adjacent exposed marginal edges of the glass outer surface, and squeezes out any excess first bead over to the exposed side surfaces, thereby partially or fully covering the exposed side surfaces; and (d) depositing a bead of a second hardenable polymeric material (second bead) in the glass support fixture in an amount sufficient to cover the marginal edges of the glass inner surface, and the glass side surfaces.

In a second aspect, this invention is a process for preparing a prefabricated vehicle window having a decorative molding comprising the sequential steps of:

(a) placing a protective film inside a glass support fixture having a cavity to line the cavity;

(b) placing a decorative film on top of the protective film;

(c) depositing a bead of a first hardenable polymeric material (first bead) on top of the decorative film, in an amount sufficient to fully cover the marginal edges of the outer surface of a glass sheet subsequently placed on the glass support fixture;

(d) placing a glass sheet having exposed side surfaces, inner surface and outer surface on the glass support fixture, with the outer surface facing toward the glass support fixture, and at least a portion of its periphery pressing against the first bead which causes the first bead to conform to the shape and contour of the protective and decorative film-covered glass support fixture cavity and cover the adjacent exposed marginal edges of the glass outer surface, and squeezes out any excess first bead over to the exposed side surfaces, thereby partially or fully covering the exposed side surfaces; and (e) depositing a bead of a second hardenable polymeric material (second bead) in the glass support fixture in an amount sufficient to cover the marginal edges of the glass inner surface, and the glass side surfaces.

In a third aspect, this invention is a process for preparing a prefabricated vehicle window having a decorative molding comprising the sequential steps of:

(a) placing a protective film inside a glass support fixture having a cavity to line the cavity;

(b) placing a decorative film on top of the protective film;

(c) depositing a bead of a first hardenable polymeric material (first bead) on top of the decorative film, in an amount sufficient to fully cover the marginal edges of the outer surface of a glass sheet subsequently placed on the glass support fixture;

(d) embedding a functional article in the bead of first hardenable polymeric material;

(e) placing a glass sheet having exposed side surfaces, inner surface and outer surface on the glass support fixture, with the outer surface facing toward the glass support fixture, and at least a portion of its periphery pressing against the first bead which causes the first bead to conform to the shape and contour of the protective and decorative film-covered glass support fixture cavity and cover the adjacent exposed marginal edges of the outer glass surface, and squeezes out any excess first bead over to the exposed side surfaces, thereby partially or fully covering the exposed side surfaces; and (f) depositing a bead of a second hardenable polymeric material (second bead) on the glass support fixture in an amount sufficient to cover the marginal edges of the glass inner surface, and the glass side surfaces.

It has been discovered that the process of the present invention provides the vehicle window glass manufacturer the flexibility to change the style, shape and/or color of a vehicle window's exterior molding without installing additional fixtures to make the desired changes.

DETAILED DESCRIPTION OF THE INVENTION

Figure 1:
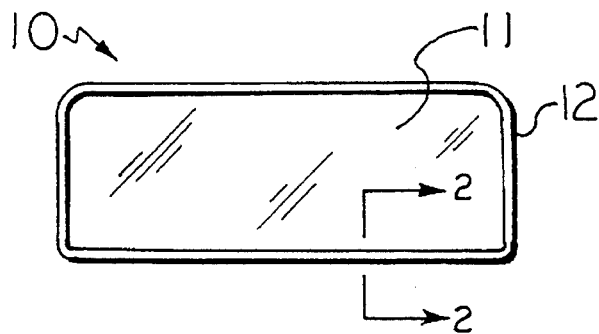
FIG. 1 is a perspective view of the prefabricated vehicle window of the invention.
Figure 2:
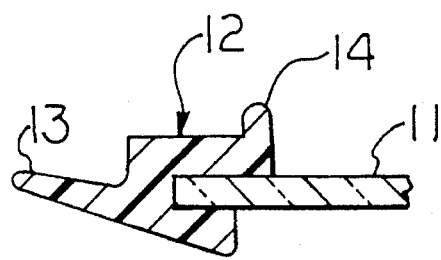
FIG. 2 is a partial cross-sectional view of the prefabricated vehicle window of the invention taken along line 2—2 of FIG. 1.
Figure 2A:
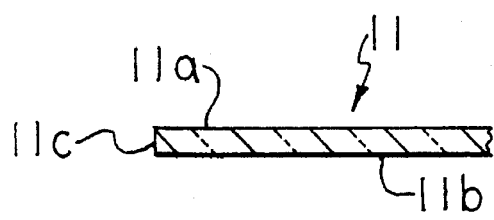
FIG. 2A shows the inner and outer surfaces and the side surface of the glass sheet 11 of FIG. 2.
Figure 3:
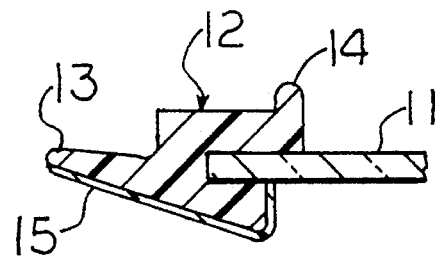
FIG. 3 is a partial cross-sectional view of another embodiment of the vehicle window of the present invention taken along line 2—2 of FIG. 1.

Referring now to the drawings, there is shown in FIG. 1 a prefabricated vehicle window 10 which is suitable for installation in an automotive vehicle as a windshield, rear window, side window, roof panel or other fixed windows on a vehicle. More specifically, as shown in FIG. 2, the vehicle window 10 comprises a glass sheet 11 which may be monolithic or laminated, curved or flat, coated or uncoated, having a molding 12, optionally covered with a protective film 15, as shown in FIG. 3. Molding 12 is formed along at least a portion of the periphery of glass sheet 11 and extends to cover the marginal edges of the inner surface 11a, the marginal edges of outer surface 11b and the side surfaces 11c. As used herein, the term "inner surface" refers to the surface facing the interior of the vehicle when the vehicle window is mounted on a vehicle, and the term "outer surface" refers to the surface facing the outside elements. The term "side surface" refers to the surface extending from an edge of the inner surface to an opposite edge of the outer surface of the glass and along the periphery of the glass. The term "edge" refers to the line where the inner surface or the outer surface meets the side surface. The term "marginal edge" refers to the area lying parallel to and immediately adjoining an edge. The glass sheet, as described, has four side surfaces, one outer surface and one inner surface. Each of the outer surface and the inner surface has four marginal edges.

Preferably, molding 12 is provided with a fin 13 and a rib 14. Fin 13 is designed to provide the vehicle with the styling or cosmetic features desired by the vehicle manufacturer. Fin 13 also prevents wind noise from starting in the depression between the edge of the glass and the inner edge of the vehicle window opening. It also hides from the consumer any defects in the glass edge caused by improper installation of the vehicle window. Rib 14 ensures that a moisture-curable adhesive which is subsequently applied to the prefabricated window does not squeeze out toward the interior of the vehicle which could result in damage to the interior trim. Rib 14 also serves as a spacer between the glass and the exterior of the vehicle. However, rib 14 is not needed if the the second bead is made of a heat-curable adhesive.

Figure 4:
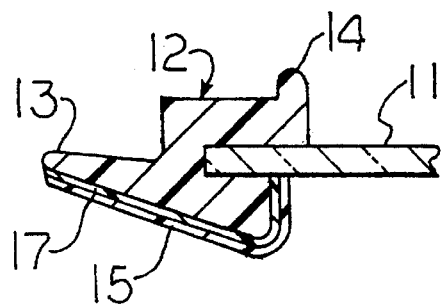
FIG. 4 is a cross-sectional view of still another embodiment of the vehicle window of the present invention taken along line 2—2 of FIG. 1.
Figure 5A:
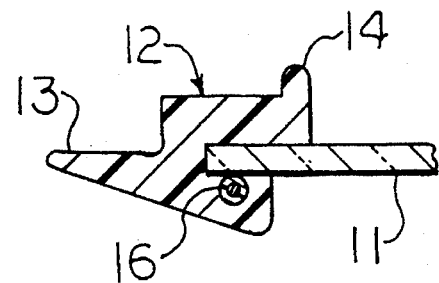
FIGS. 5A and 5B are cross-sectional views of still further embodiments of the vehicle window of the present invention taken along line 2—2 of FIG. 1.
Figure 5B:
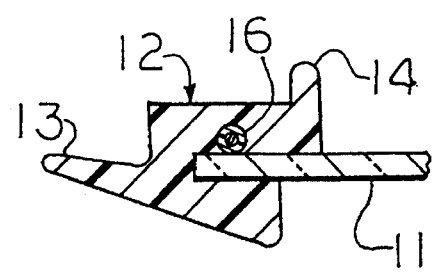

In another embodiment of the present invention, a decorative film 17 is inserted between molding 12 and protective film 15, as shown in FIG. 4. Optionally, a functional article 16, such as a computer chip or a wire which serves as an antenna, a heating element or a separating wire adapted to remove a damaged window, is embedded in molding 12, as shown in FIGS. 5A and 5B.

Figure 7A:
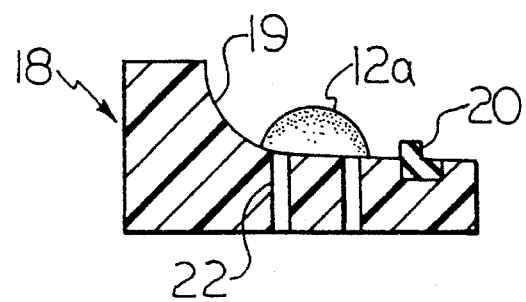
FIGS. 7A–7C illustrate the manufacturing steps of an embodiment of the process of the present invention.
Figure 7B:
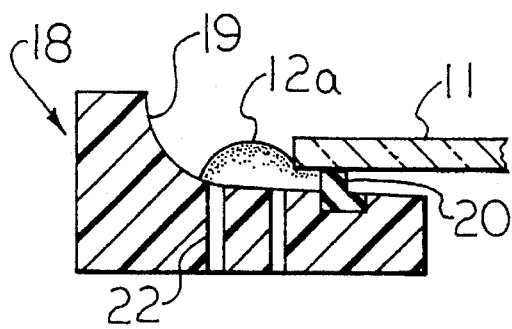
Figure 7C:
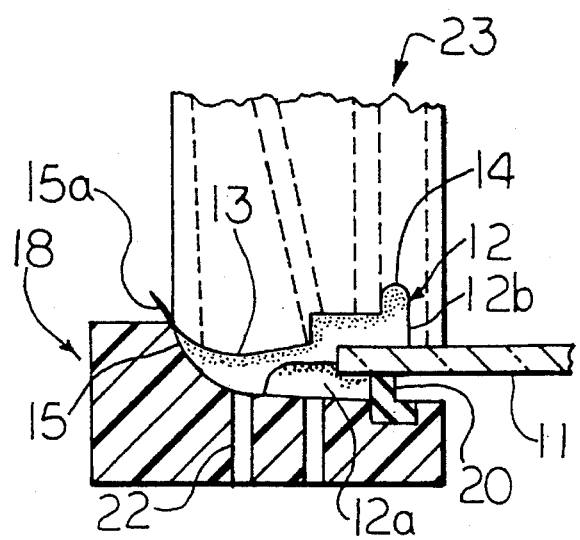

As shown in FIG. 7C, molding 12 comprises a bead 12a of a first hardenable polymeric material (first bead) and a bead 12b of a second hardenable polymeric material (second bead).

Suitable first hardenable polymeric materials include any substance which will form an elastomeric polymer which bonds well to the window upon curing. Preferable first hardenable polymeric materials include the two-component polyurethane system, the butyl rubber system or the silicon elastomer system described in U.S. Pat. No. 4,571,278, the relevant portions of which are incorporated herein by reference.

The second hardenable polymeric material can be the same as or different from the first hardenable polymeric material. Advantageously, the two hardenable polymeric materials must be compatible and bond to each other to form an encasement of cured polymeric material on the side surface of the glass and the marginal edges of the inner surface and the outer surface of the glass. Preferable second hardenable polymeric materials include the adhesive materials described in U.S. Pat. No. 4,879,853, incorporated herein by reference. Such adhesive materials include the oxygen- or air-curable adhesive materials, the moisture-curable adhesive materials, the heat-curable adhesive materials, the adhesive materials known in the art as "hot melts" and the slow-reacting two-component systems, such as for example, mixtures consisting of polyurethane prepolymers containing OH-groups and polyurethane prepolymers containing NCO-groups.

Adhesion promoters, such as those described in U.S. Pat. Nos. 4,839,122 and 4,761,916, can be used to improve the bond between the first and/or second hardenable material and the glass. Examples of such adhesion promoters include "Betaseal® Glass Primer 435.18", "Betaseal®Glass Primer 435.20" and "Betaseal® Glass Primer 435.21", produced by Essex Specialty Products, Inc.

The moisture-curable adhesive materials and the air-curable adhesive materials can be encapsulated in a moisture or oxygen barrier film, depending on whether the adhesive material is moisture-curable or oxygen-curable. Such barrier films prevent the adhesive from curing for a period of at least about 7 days following the completion of the process for making the prefabricated window. Suitable barrier films include films prepared from organic barrier polymers based on vinylidene chloride, acrylonitrile and ethylene-vinyl alcohol, such as nitrile polymers, vinylidene chloride copolymers and ethylene-vinyl alcohol copolymers; and other barrier polymers such as polyesters, polyamides and polyfluorides. Examples of such barrier films include polyvinylidene chloride films, available as Saran™ films from The Dow Chemical Company, and polyester/metal laminate films available from Courtaulds and Cadillac Plastics.

Protective film 15 can be made from any film which protects molding 12 from the deleterious effects of exposure to elements such as ultraviolet light radiation. Protective film 15 should be thick and/or strong enough to not rupture during the process for preparing the prefabricated vehicle window, and during handling of the window during storage and shipment, but is thin and/or flexible enough to enable the film to conform to the dimensions of the cavity used in the process. Preferably, such a film has a thickness in the range of from about 0.002 mil ($5 \times 10^{-5}$ mm) to about 0.004 mil ($1 \times 10^{-4}$ mm). Preferably, the film has a tensile strength which is sufficient to prevent tearing of the film during the process for preparing the prefabricated vehicle window of the invention, and during handling of the window during storage and shipment. Examples of such films include films made of polyvinyl chloride, acrylic, polyethylene and polyvinyl fluoride. A preferred material is a 2 to 4 mil (5 to 10 mm) thick film of polyvinyl chloride. The protective film is removed by the vehicle manufacturer upon installation of the window to the vehicle.

Decorative film 17 is primarily a styling or cosmetic feature of the vehicle window and can be made from polyesters such as Mylar™, a polyethylene terephthalate sold by E. I. du Pont de Nemours, polyurethanes, cellulose esters, acrylics and polyvinyl fluorides. A preferred decorative film is a film laminate comprising a Mylar™ film sandwiched between two film layers of a polyester having adhesive properties.

The vehicle window can be of a shape suitable for installation as a windshield, rear window, side window, roof panel or other fixed windows on a vehicle.

Figure 6:
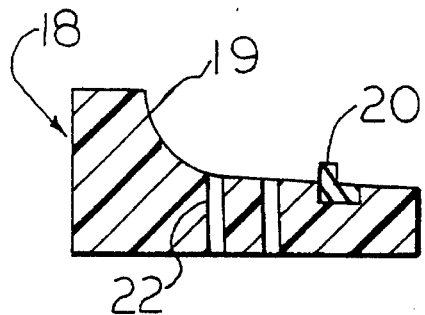
FIG. 6 is a cross-sectional view of the glass support fixture of the present invention.

Referring now to FIG. 6, there is shown a glass support fixture generally indicated at 18, which is employed in the fabrication of vehicle window 10. Glass support fixture 18 is provided with a cavity 19 and glass support ring 20. Cavity 19 is shaped to the desired contour of and in the dimensions a portion of the of molding 12. Preferably, the glass support fixture is provided with perforations 22 which are connected to a vacuum and/or gas pressure system (not shown). Optionally, the glass support fixture is provided with a groove (not shown) to receive decorative film 17. The glass support fixture is constructed from a substantially rigid metal or molded plastic, shaped to match the periphery of the vehicle window. It may be of any suitable size or linear dimension sufficient to hold the required amount of hardenable polymeric material to form molding 12.

Figure 6A:
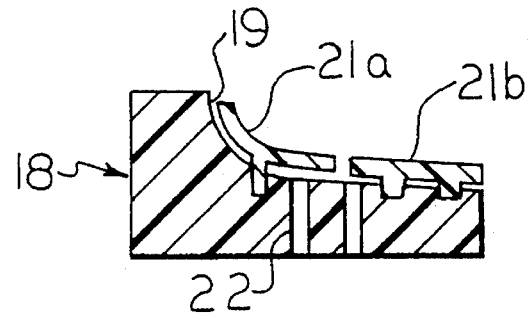
FIGS. 6A and 6B are cross-sectional views of alternative glass support fixtures of the present invention.

In another embodiment, the glass support fixture cavity 19 is provided with at least one removable insert that allows the shape of molding 12 to be formed without building a new glass support fixture. This feature allows the window manufacturer to run off of one fixture several models of glass/molding designs. The insert is made from substantially rigid metal or molded plastics and may be the same as or different from the material used in making the glass support fixture. The glass support fixture shown in FIG. 6A, as an example, has a cavity provided with two inserts 21a and 21b.

Figure 6B:
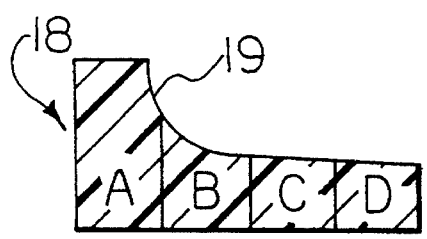

In still another embodiment, the glass support fixture cavity comprises at least two detachable pieces. This feature allows the window manufacturer to alter the length and/or width of the glass fixture to fit the length and/or width of the glass sheet without using another glass support fixture. The glass support fixture shown in FIG. 6B, as an example, is formed of four detachable pieces A, B, C and D.

To fabricate the vehicle window, protective film 15, shown in FIG. 7C with a tab 15a, is applied to cavity 19 (shown in FIG. 6B) of glass support fixture 18. First, hardenable polymeric material, in the form of a bead (first bead 12a), is then deposited on top of protective film 15 by employing well-known extrusion or dispensing devices. If desired, a decorative film 17 is applied over protective film 15 prior to the deposition of the first bead to provide vehicle window 10 with a decorative styling insert. Protective film 15 and decorative film 17 will readily conform to the shape and contour of cavity 19 upon deposition of the first bead. A vacuum is applied to glass support fixture 18 and protective film 15 through perforations 22 to assist in conforming the films to the shape and contour of cavity 19. Protective film 15 and decorative film 17 can be placed inside the glass support fixture manually or by any suitable means. After the first bead is deposited on top of protective film 15 or decorative film 17, glass sheet 11, having four side surfaces, an inner surface and an outer surface, is placed or installed in glass support fixture 18 with the outer surface facing toward the glass support fixture, and at least a portion of its periphery pressing against first bead 12a. Optionally, before the installation of the glass sheet in glass support fixture 18, a functional article 16, such as a computer chip, or a wire which serves as an antenna, a heating element, a separating wire adapted to remove a damaged window or the like, can be embedded in first bead 12a as shown in FIGS. 5A and 5B. For aesthetic reasons, it is preferred that the article be hidden from view or at least covered by the decorative film 17.

The installation of glass sheet 11 on the glass support fixture causes the previously deposited first bead to conform to the shape and contour of the film-covered cavity 19 and cover the adjacent exposed marginal edges of the outer glass surface, and squeezes out any excess first bead over to the exposed side surfaces of the glass. The squeezed-out excess first bead partially or fully encases the exposed glass side surfaces. The installed glass sheet 11 is supported by a compressible glass support ring 20 which is positioned along the periphery of the glass support fixture. Glass support ring 20 has enough yield to prevent breakage of the glass sheet and yet is stiff enough to maintain the weight of the entire glass sheet and the shape of the first bead which is in contact with cavity 19 and the marginal edges of the outer glass surface. Glass support ring 20 is, in general, made of a thermoplastic elastomer. Preferably, the thermoplastic elastomer is an ethylene-propylene copolymer or a terpolymer (EPDM) containing ethylene and propylene in the backbone and a diene in the side chain. Such terpolymers are described in U.S. Pat. No. 3,654,005, pertinent portions of which are incorporated herein by reference. Typical examples of EPDM are Vistalon™ 4504 (Enjay Chemical Co.), a polymer having a Mooney viscosity at 212° F. of about 40 prepared from a monomer blend having an ethylene content of about 56 weight percent and a non-conjugated diene content of about 3.3 weight percent, and Vistalon™ 3708 having a Mooney viscosity of 50 at 260° F., about 75 weight percent ethylene and about 3.0 weight percent diene monomer. In addition to its function of supporting the glass sheet, glass support ring 20 also provides a seal between protective film 15 or decorative film 17 and glass sheet 11 which will prevent inboard bleeding of the deposited first bead.

After the installation of glass sheet 11 on glass support fixture 18, a bead of a second hardenable polymeric material (second bead 12b) is deposited into cavity 19 to cover the marginal edges of the glass inner surface and the glass side surfaces. The deposition of the second bead can be done by employing well-known extrusion or dispensing devices. Preferably, as shown in FIG. 7C, a multicavity nozzle system 23 is employed in depositing the second bead into the glass support fixture. Each cavity of the multicavity nozzle is provided with control means (not shown) to control the flow rate and quantity of the second bead to be deposited. For example, the multicavity nozzle control means opens the flow of the second bead to portions of the glass periphery where the molding fin 13 and/or molding rib 14 are required, and shuts off the flow to those portions where the fin and/or rib are not required. Variations in molding cross-sections, including the thickness of the molding rib, are also attainable by varying the volume of the second bead delivered to given zones of the glass periphery, the volume variations being controlled by the multicavity nozzle control means. Multicavity nozzle systems are known in the art and need no further explanation.

After the second bead is deposited, the multicavity nozzle is retracted and any "tail" which results from the retraction of the multicavity nozzle is depressed by manually or automatically folding tab 15A of protective film 15 over the deposited second bead. At this point, additional functional articles can be embedded into the second bead. Alternatively, the functional articles can be coextruded with the second bead by the multicavity nozzle. These articles can run the entire periphery of the glass or can be placed strategically at optimal locations around the glass periphery. The articles can be similar or different in functions.

The vehicle window is removed from the glass support fixture and the first hardenable polymeric material and the second hardenable polymeric material (if not a moisture- or air-curable adhesive encapsulated in a moisture or air barrier film) are cured by any suitable method, such as by heat, UV radiation, induction heating, or infrared heating, to form an encasement of cured polymer on the side surfaces of the glass and on the marginal edges of the inner surface and the outer surface of the glass. After the hardenable polymeric materials described previously are cured, molding fin 13 is cut to the desired length and protective film 15, which is not bonded to the molding, is readily removed manually or by other methods well known in the art, and the finished glass vehicle window is shipped out to the vehicle manufacturer for installation of the window to a vehicle. If desired by the vehicle manufacturer, the finished glass vehicle window is shipped out without removing the protective film 15.

Figure 8:
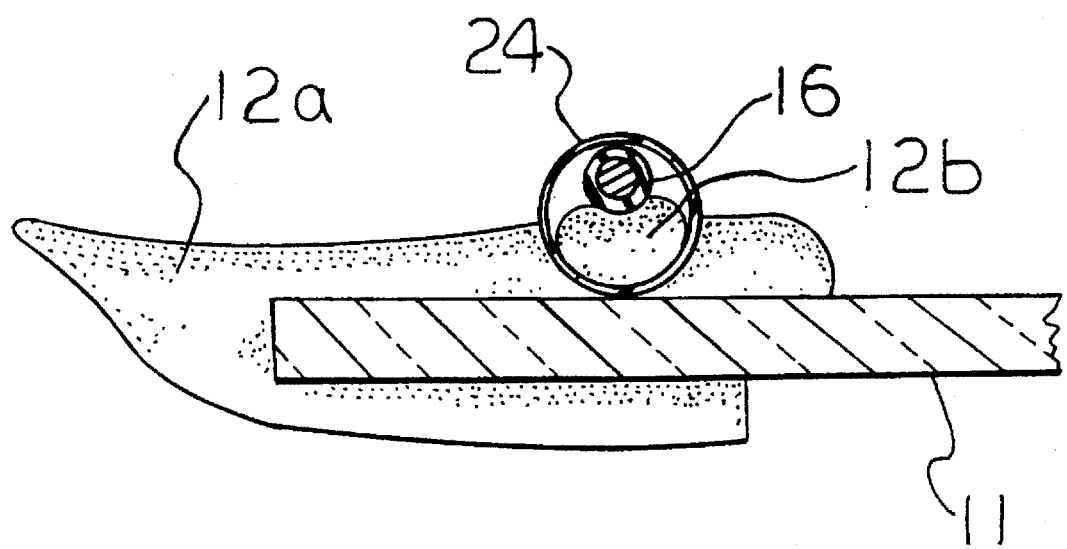
FIG. 8 shows another embodiment of the prefabricated window of the present invention.

If the second hardenable polymeric material is in the form of an encapsulated moisture-curable or air-curable adhesive material as described previously, it can be laid down onto the glass sheet and in the first bead 12a, as shown in FIG. 8. The functional article 16 shown in FIG. 8 is optional. The prefabricated window with the adhesive can then be shipped to the vehicle manufacturer. In the plant, the vehicle manufacturer removes or slits the barrier film 24 to allow the adhesive to come in contact with the vehicle flange (the substrate which forms the vehicle window opening). Removing the barrier film can be done by means known in the art, such as by slitting the film, or by heating it. By heating the film, the film shrinks and implodes, forcing the adhesive out to the surface. The vehicle window can then be installed onto a vehicle by pressing the adhesive against the vehicle flange while the adhesive is still in its "substantially uncured" state. By "substantially uncured", it is meant that the adhesive has not cured to the point at which it no longer bonds effectively with a metal window flange upon removal of the barrier film.

The prefabricated vehicle windows of the present invention are suitably prepared at the glass manufacturer and shipped and stored at the vehicle manufacturer until they are ready for installation.

At the vehicle assembly plant, moisture-curable adhesives which are used to bond the prefabricated window to a vehicle can be deposited on top of the bead of second hardenable polymeric material by the vehicle manufacturer just prior to the mounting of the prefabricated window by methods well known in the art. See, for example, U.S. Pat. Nos. 4,551,372, 4,571,278, 4,704,175 and 4,780,520. Preferably, such adhesives are pre-applied on top of the bead of second hardenable polymeric material by the vehicle window manufacturer prior to shipment of the vehicle window by well-known methods, such as those described in U.S. Pat. Nos. 4,879,853, 4,986,867 and 5,330,597. However, if the second hardenable polymeric material is a moisture-curable or air-curable adhesive material encapsulated in a moisture or oxygen barrier film as described previously, there is no need for such extra steps of depositing or pre-applying such moisture-curable adhesives on top of the second hardenable polymeric material.

Although the invention is specifically described with respect to the preferred embodiment, that is, the process for preparing a prefabricated vehicle window, the present process is also applicable to the preparation of other articles having a molding, such as, for example, industrial or home glass panes, plastic sheets used in bullet proof bank windows, wood sheets or metal sheets and the like.

What is claimed is:

1. A process for preparing a prefabricated vehicle window having an exterior molding comprising the sequential steps of:

(a) placing a protective film inside a glass support fixture having a cavity, said film lining the cavity;

(b) depositing a bead of a first hardenable polymeric material on top of the protective film fin an amount sufficient to fully cover the marginal edges of the outer surface of a glass sheet subsequently placed on the glass support fixture;

(c) placing a glass sheet having exposed side surfaces, inner surface and outer surface on the glass support fixture, with the outer surface facing toward the glass support fixture, and at least a portion of its periphery pressing against the first polymeric material which causes the first polymeric material to conform to the shape and contour of the film-covered glass support fixture cavity and cover the adjacent exposed marginal edges of the outer glass surface, and squeezes out excess first polymeric material over to the exposed side surfaces, thereby partially or fully covering the exposed side surfaces; and (d) depositing a bead of a second hardenable polymeric material in the glass support fixture to cover the marginal edges of the glass inner surface, the glass side surfaces and/or the first polymeric material covering the side surfaces;

(e) removing the glass with the protective film, the first polymeric material and the second polymeric material from the support surface;

(f) curing the first and second polymeric materials to form the prefabricated vehicle window.

2. The process of claim 1, wherein the glass support fixture cavity is shaped to the desired contour and dimensions of a portion of the exterior molding.

3. The process of claim 1, wherein the glass support fixture is provided with perforations connected to a vacuum and/or pressure source.

4. The process of claim 1, wherein the glass support fixture is provided with a groove adapted to receive a decorative film.

5. The process of claim 1, wherein the glass support fixture is provided with at least one removable insert that allows different shapes of exterior molding to be formed without using another glass support fixture.

6. The process of claim 1, wherein the glass support fixture comprises at least two detachable pieces.

7. A process for preparing a prefabricated vehicle window having a decorative molding comprising the sequential steps of:

(a) placing a protective film inside a glass support fixture having a cavity, said film lining the cavity;

(b) placing a decorative film on top of the protective film;

(c) depositing a bead of a first hardenable polymeric material on top of the decorative film, in an amount sufficient to fully cover the marginal edges of the outer surface of a glass sheet subsequently placed on the glass support fixture;

(d) placing a glass sheet having exposed side surfaces, inner surface and outer surface on the glass support fixture, with the outer surface facing toward the glass support fixture, and at least a portion of its periphery pressing against the first polymeric material which causes the first polymeric material to conform to the shape and contour of the protective and decorative film-covered glass support fixture cavity and cover the adjacent exposed marginal edges of the outer glass surface, and squeezes out excess first polymeric material over to the exposed side surfaces, thereby partially or fully covering the exposed side surfaces; and (e) depositing a bead of a second hardenable polymeric material in the glass support fixture to cover the marginal edges of the glass inner surface, and the glass side surfaces and/or the first polymeric material covering the side surfaces;

(f) removing the glass with the protective film, the decorative film, the first polymeric material and the second polymeric material from the support surface;

(g) curing the first and second polymeric materials to form the prefabricated vehicle window.

8. A process for preparing a prefabricated vehicle window having a decorative molding comprising the sequential steps of:

(a) placing a protective film inside a glass support fixture having a cavity, said film lining the cavity;

(b) placing a decorative film on top of the protective film;

(c) depositing a bead of a first hardenable polymeric material on top of the decorative film, in an amount sufficient to fully cover the marginal edges of the outer surface of a glass sheet subsequently placed on the glass support fixture;

(d) embedding a functional article in the bead of first hardenable polymeric material;

(e) placing a glass sheet having exposed side surfaces, inner surface and outer surface on the glass support fixture, with the outer surface facing toward the glass support fixture, and at least a portion of its periphery pressing against the first polymeric material which causes the first polymeric material to conform to the shape and contour of the protective and decorative film-covered glass support fixture cavity and cover the adjacent exposed marginal edges of the outer glass surfaces and squeezes out excess first polymeric material over to the exposed side surfaces, thereby partially or fully covering the exposed side surfaces; and (f) depositing a bead of a second hardenable polymeric material in the glass support fixture to cover the marginal edges of the glass inner surface, and the glass side surfaces and/or the first polymeric material covering the side surfaces;

(g) removing the glass with the protective film, the decorative film, the functional article, the first polymeric material and the second polymeric material from the support surface;

(h) curing the first and second polymeric materials to form the prefabricated vehicle window.

9. The process of claim 8 wherein the functional article is an antenna, a heating element, a computer chip or a separating wire adapted to remove a damaged window.

10. A process for preparing an article having a molding along its periphery, comprising the sequential steps of:

(a) placing a protective film inside a support fixture having a cavity, said film lining the cavity;

(b) depositing a bead of a first hardenable polymeric material on top of the protective film in an amount sufficient to fully cover the marginal edges of the outer surface of a glass sheet, plastic sheet, wood sheet or metal sheet subsequently placed on the support fixture;

(c) placing a glass sheet, plastic sheet, wood sheet or metal sheet having exposed side surfaces, inner surface and outer surface on the support fixture, with the outer surface facing toward the support fixture, and at least a portion of its periphery pressing against the first polymeric material which causes the first polymeric material to conform to the shape and contour of the film-covered support fixture cavity and cover the adjacent exposed marginal edges of the outer surface of the glass, plastic, wood or metal sheet, and squeezes out excess first polymeric material over the exposed side surfaces, thereby partially or fully covering the exposed side surfaces; and (d) depositing a bead of a second hardenable polymeric material in the support fixture to cover the marginal edges of the inner and side surfaces of the glass, plastic, wood or metal sheets and/or the first polymeric material covering the side surfaces;

(e) removing the glass, plastic, wood or metal sheet with the protective film, the first polymeric material and the second polymeric material from the support surface;

(f) curing the first and second polymeric materials to form the article having a molding along its periphery.

* * * * *